Patented Oct. 29, 1946

2,410,187

UNITED STATES PATENT OFFICE 2,410,187

COATING COMPOSITION

Clifford Kanne Sloan, Thornton, Pa., and Gordon Derby Patterson, Wilmington, Del., assignors to E. I. du Pont de Nemours & Company, Wilmington, Del., a corporation of Delaware No Drawing. Application April 28, 1943, Serial No. 484,881

9 Claims. (Cl. 260—19)

This invention relates to the production of novel coating compositions, and more particularly to the manufacture of improved coating compositions of the metal protective type.

More specifically, the invention pertains to calcium chromate pigment-containing coating compositions of improved durability, resistance toward weathering or atmospheric influences, and improved metal protective action, and to their preparation.

Metal protective pigments have long been used in the priming coat of organic film-forming compositions applied to the surface of metal objects. Such pigments have been effective at least in part because of a specific inhibiting or passivating action at the surface of the metal.

Although calcium chromate has been suggested as a useful pigmenting substance in certain linseed oil and varnish vehicles, such compositions have not been commercially exploited to any appreciable extent. Included among the deficiencies responsible for such low use of this type of pigment composition are slow drying, poor durability and high water permeability.

It has been found that the above and other defects characterizing prior coating compositions containing calcium chromate pigments may be effectively overcome. One principal object of the invention, therefore, is to provide a novel method and means for attaining this result. A particular object is to prepare a new and improved metal protective pigment coating composition, especially an improved calcium chromate-containing organic film-forming metal protective coating of low water permeability, high durability and readily adapted to dry rapidly. A further object is to provide pigmented coating compositions having better resistance towards the undesired checking and cracking tendencies which have characterized prior compositions. An additional object is to provide a coating manifesting a clear cooperative effect between the vehicle and pigment used in order to obtain a combination of properties and unexpected results not heretofore attainable in orthodox vehicles, such as of the drying oil or varnish type. A specific object is to prepare an improved, organic film-forming metal protective pigment coating composition wherein calcium chromate comprises the pigmenting substance, and which possesses unusual merit in respect to can stability, rapidity of drying, durability, and high efficiency in inhibitive value. Additional objects will be apparent from the following description of the invention.

These and other objects are attainable in this invention which preferably comprises incorporating a calcium chromate pigment in a vehicle of high impermeability containing, as the binder, an alkyd resin comprising, in combined form, between about 40% and about 70% of combined drying oil glyceride and at least 30% of a polyhydric alcohol-polycarboxylic acid resin, said vehicle having an impermeability value of at least 5.

In preparing the coating compositions of this invention, the calcium chromate pigment component is ground or dispersed in a conventional manner with said oil-modified alkyd systems, sufficient solvent and diluent being employed during the grinding or dispersing operation as will provide a consistency suited to the dispersing device used. The paint composition which results may be then reduced to application consistency through addition of sufficient amounts of a thinning medium, solvent or diluent, as for example mineral spirits, turpentine, benzol, etc. The drier may be added at any desired point in the preparation of the coating composition.

The resulting coating composition, though generally employable, will be especially useful for effectively protecting structural steel surfaces, particularly where the coating is applied to the metal surface by brushing. Such maintenance painting, in most instances, is limited to the use of air drying systems, prior art systems having been deficient, either in can stability or in effectual inhibiting power. As already noted, the calcium chromate pigment is of particular merit for use in alkyd vehicles, and, in comparison with present commercial metal protective pigments, will be found to combine (1) effectiveness as a rust inhibitor with (2) resistance to thickening on can storage. Thus, the calcium chromate is superior in metal protective exposure performance to other chromates, including zinc yellow and basic lead chromate; and, at the same time, is free from the can thickening difficulties which limits red lead use in vehicles exhibiting improved durability and rapid drying characteristics.

The present coating composition is also useful for protecting metallic surfaces exposed to severe moisture conditions, and is therefore applicable to water and air-borne ships; also for the protection of non-ferrous metals, including aluminum, zinc, magnesium and the like, as well as alloys, particularly light-weight alloys, such as aluminum and magnesium, including the types used in air craft construction. The relatively high impermeability of the vehicle and the protective action which the calcium chromate affords appear to be properly balanced, thereby insuring prolongation of the period during which inhibition by chromate ion is assured. This optimum impermeability-available chromate balance is not present in other pigment-vehicle combinations.

To a clearer understanding of the invention, the following examples are given, each of which is in illustration but not in limitation of the invention.

*Example I*

The following ingredients are prepared as a paint by grinding 16 hours in a ball mill:

| | Parts |
|---|---|
| Calcium chromate | 3,200 |
| Alkyd (62% linseed oil-modified glyceryl phthalate vehicle, 70% solids) | 1,905 |
| Raw linseed oil | 443 |
| Lauric acid, technical grade | 85 |
| Mineral spirit | 409 |
| Lead drier (24% Pb) | 22 |
| Cobalt drier (6% Co) | 9 |

The resulting alkyd-fortified paint is characterized by excellent can stability, rapidity of drying, and excellent metal protective properties. The rapidity of drying is shown by comparative experiments in which calcium chromate in oil dried in 48 hours, whereas calcium chromate in an oil-modified alkyd resin dried in 8 hours. Under the same conditions, it took at least 18 hours for a red lead-oil composition to dry.

*Example II*

A calcium chromate-alkyd paint is prepared in a manner similar to Example I except that the raw linseed oil is replaced by an equal volume of the alkyd. The resulting pigmented coating composition has greater resistance to can thickening than a similar paint pigmented with red lead instead of calcium chromate, is characterized by excellent drying properties, and is markedly superior in metal protective properties to systems consisting of the same vehicle with other pigments, including such chromate pigments as basic lead chromate and zinc yellow. The calcium chromate-alkyd film shows improved metal protective performance as compared with the red lead system, and exhibits improved resistance to can instability (thickening), and to chalking and erosion failure.

*Example III*

A paint is prepared from the following ingredients:

| | Parts |
|---|---|
| Zinc yellow | 285 |
| Talc | 373 |
| Calcium chromate | 111 | ground in 512 parts of an alkyd vehicle consisting of 62% linseed oil-modified glyceryl phthalate, and 242 parts of a hydrocarbon solvent of the type known commercially as high flash naphtha. To this mixture is added, after the grind, a solution of 56 parts of a lead-cobalt drier in 31 parts of high flash naphtha. The paint is applied to aluminum panels exposed to the south at an angle of 45° to the vertical. The panels have two coats of an aluminum-alkyd system on top of the primer described above. After 36 months' exposure, the paint showed no blistering at all and a knife-scratch test showed that it had excellent adhesion to the metal surface.

A corresponding primer where the total pigment consisted of an equivalent volume of zinc yellow alone, the other ingredients being the same, showed, after the same length of exposure under the same conditions, fine blistering and less adhesion to the metal surface.

In the practice of the invention, use is preferred of oil-modified alkyd vehicles having a water-impermeability of greater than 5, particularly vehicles having water-impermeability greater than this value after 6 months' outdoor exposure. The following table illustrates the effect of oil length in a series of linseed oil-modified alkyd resins on the water-impermeability at a film thickness of 0.005 inch after 6 months' outdoor exposure. Similar data are given for ordinary drying oil control films of linseed and China-wood oils.

| Composition | Impermeability to water of 0.005 inch film at 35° C. after 6 months' outdoor exposure |
|---|---|
| Linseed oil, heat bodied | 1.2 |
| Linseed oil, air blown | 0.8 |
| China-wood oil, heat bodied | 2.8 |
| 35% linseed oil-modified alkyd resin | 4.2 |
| 40% linseed oil-modified alkyd resin | 8.4 |
| 50% linseed oil-modified alkyd resin | 17.0 |
| 55% linseed oil-modified alkyd resin | 13.4 |
| 62% linseed oil-modified alkyd resin | 6.8 |
| 80% linseed oil-modified alkyd resin | 1.9 |

The above impermeability values are expressed in terms of the number of hours required for one square centimeter of film to transmit one milligram of water. This value varies inversely as the permeability. Thus, the higher the impermeability value, the more completely the film excludes moisture. The values are readily determined by sealing the film across the open mouth of a vessel containing a desiccant and keeping water in contact with the outer surface of the film. The net gain in weight is determined from time to time and the impermeability calculated in units as above indicated. It will be seen that acceptable permeability values for a linseed oil-modified alkyd resin are obtained when such vehicles contain between about 40% and about 70% of linseed oil.

Most grades of calcium chromate may be used in the practice of the invention. Thus, precipitated calcium chromate, obtained by reacting a water-soluble alkali (sodium, potassium) chromate or bichromate with a calcium salt, especially soluble salts such as calcium chloride, nitrate, chlorate, etc., may be usefully employed. Water-repellent grades of pigment calcium chromate are preferably utilized, those containing small amounts of adsorbed polar agents of the cation-active and anion-active type, produced in accordance with the disclosures of the co-pending application of Clifford K. Sloan, Ser. No. 484,883, filed April 28, 1943, being especially useful. Similarly useful are the light-stable calcium chromate pigments containing colored, water-insoluble oxides of trivalent metals, especially of chromium, manganese and iron, disclosed in the co-pending application of Clifford K. Sloan, Ser. No. 484,882, filed April 28, 1943.

The prime calcium chromate pigment used herein may be employed alone or may be extended with various inorganic extenders, such as asbestine, talc, barium or calcium sulfate, or the like; or it may be used with other pigments, such as zinc yellow or red lead. In such a case, however, at least 10% and preferably at least 15% by weight of the total pigment should be calcium chromate, in order to insure obtaining desired benefits under the invention. Also, the total pigment volume in the compositions described herein is preferably between about 25% and about 45%.

While the above examples are illustrative of certain practical embodiments of the invention using particular linseed oil-modified synthetic resins, other alkyds or phenolaldehyde resins, especially those modified with drying oils and more especially modified resins having an impermeability value of at least 5, are contemplated for use. Vehicles that have a water-impermeability value greater than 5 after six months' outdoor exposure are particularly preferred for use. Oil-modified resinous condensation products, especially alkyd resins resulting from the reaction of one or more polybasic acids and one or more polyhydric alcohols with one or more drying oils, (linseed oil, poppy oil, tung oil), semi-drying oils, etc., are also preferred for use. For example, a preferred resinous vehicle comprises that formed by condensation of phthalic acid or anhydride and glycerol with a modifying agent, such as linseed oil, China-wood oil, perilla oil, oiticica oil, or the like. Such modified alkyd resins can be obtained from well-known methods, as for example, by heating the reactants at any suitable temperature above the melting point of the materials until resinification is complete. The oil modifying component may be incorporated with the alkyd resin base by mixing the same with phthalic acid or anhydride and glycerol, followed by stirring to promote reaction and formation of a homogeneous melt. Preferably, however, the oil is first heated with the glycerol before adding the phthalic anhydride, in order that a more homogeneous product will be obtained. As already indicated, though modified glyceryl phthalate resins are preferred for use, other polyhydric alcohol-polybasic acid resins having the general properties of those indicated may be substituted for said modified glyceryl phthalate. Specific examples of additional useful alkyd resins include those listed at page 4 of U. S. Patent 2,282,827.

Certain drying oil modified phenol formaldehyde rasins vehicles may also be used in the invention, particularly those having an impermeability value above 5. These include the so-called "Bakelite" resins modified with 66% and 50% Chinawood oil and having impermeability values of 10.3 and 12.9, respectively. Other drying oils, such as those referred to in connection with alkyd resins, may also be used. These oil modified phenol-formaldehyde resin vehicles also comprise well-known synthetic resins and are readily obtained through the condensation reaction of an aldehyde and phenol with a drying oil, by either a so-called wet or dry procedure, e. g., by reacting, through gradual heating, a mixture of a drying oil, phenol and liquid formaldehyde, or a mixture of drying oil, phenol and dry or polymerized paraaldehyde. Other utilizable vehicles include chlorinated rubber, asphalt varnishes and the like, especially those having an impermeability value greater than 5. However, the invention is primarily directed to the production of metal protective pigment coating compositions comprising calcium chromate and drying oil modified alkyd resins, which give the most satisfactory results.

While the calcium chromate pigmented composition of this invention serves as a satisfactory durable coating when used alone on a metal surface (especially if a light-stable type of calcium chromate is employed), it will be understood that the films may be top-coated with conventional types of films, if desired.

The cellulosic-derivative-free coating compositions of this invention, comprising calcium chromate in binders of low water permeability, especially those containing the preferred alkyd vehicles, will possess a combination of highly desirable properties not obtainable in previous calcium chromate coatings. These distinctive and unexpected properties result by reason of the unexpected cooperative effect which is had between the types of vehicles used and the calcium chromate pigment. For instance, in the case of the preferred alkyd resin systems, there is obtained a distinctly superior and exceedingly durable type of film which is not obtained when calcium chromate is used in orthodox types of vehicles. In addition to obtaining considerably greater film durability (as evidenced by their high resistance to checking and cracking), the present films exhibit faster drying rates after application to render said coatings exceptionally valuable and useful in a wide variety of commercial applications, especially as a metal protective paint.

We claim as our invention:

1. A metal protective, pigmented coating composition comprising at least 10% by weight, based on the total pigment present, of calcium chromate and a vehicle therefor, said vehicle being selected from the group consisting of an alkyd resin and a phenol/formaldehyde resin, and having a water-impermeability value of at least 5 at a film thickness of 0.005 inch after 6 months' outdoor exposure.

2. A metal-protective coating composition comprising in combination at least 15% by weight, based on the total pigment present, of calcium chromate pigment and an oil-modified resinous vehicle consisting of combined polyhydric alcohol and a polycarboxylic acid, said vehicle having a water-impermeability value of at least 5 at a film thickness of 0.005 inch after 6 months' outdoor exposure.

3. A coating composition comprising in combination at least 15% by weight, based on the total pigment present, of calcium chromate and an oil-modified resinous vehicle consisting of a combined phenol and aldehyde, said vehicle having a water-impermeability value of at least 5 at a film thickness of 0.005 inch after 6 months' outdoor exposure.

4. A metal protective coating composition comprising in combination at least 15% by weight, based on the total pigment present, of pigment calcium chromate and a drying oil modified alkyd resin vehicle formed by condensation of glycerol and phthalic acid, said vehicle having a water-impermeability value greater than 5 at a film thickness of 0.005 inch after 6 months' outdoor exposure.

5. A metal protective coating composition comprising in combination at least 15% by weight, based on the total pigment present, of calcium chromate pigment and a vehicle therefor, the latter containing in combined form between about 40% and 70% of combined drying oil glyceride and at least 30% of a polyhydric alcohol-polycarboxylic acid synthetic resin, and having a water-impermeability value of at least 5 at a film thickness of 0.005 inch after 6 months' outdoor exposure.

6. A metal protective pigment coating composition comprising in combination at least 15% by weight, based on the total pigment present, of calcium chromate and a drying oil modified alkyd resin vehicle, said vehicle having a water impermeability above 5 at a film thickness of 0.005 inch after six months' outdoor exposure.

7. A metal protective pigment coating composition comprising in combination at least 15% by weight, based on the total pigment present, of calcium chromate and a drying oil modified phenol-aldehyde resinous vehicle, said vehicle having a water-impermeability above 5 at a film thickness of 0.005 inch after six months' outdoor exposure.

8. A metal protective pigment coating composition comprising at least 15% by weight, based on the total pigment present, of pigment calcium chromate and from about 40-70% of combined drying oil glyceride and at least 30% of a resinous vehicle formed by condensation of glycerol and phthalic acid, said vehicle having a water impermeability above 5 at a film thickness of 0.005 inch after six months' outdoor exposure.

9. A process for obtaining a durable, metal protective coating composition which comprises incorporating at least 15% by weight, based on the total pigment present in the composition of calcium chromate pigment in an oil-modified vehicle, the latter containing in combined form between about 40% and about 70% of combined drying oil glyceride and at least 30% of a synthetic alkyd resin, the water-impermeability value of said vehicle being at least 5 at a film thickness of 0.005 inch after six months' outdoor exposure.

CLIFFORD KANNE SLOAN.
GORDON DERBY PATTERSON.